Sept. 20, 1927.          H. E. ALTGELT          1,642,801
                           CULTIVATOR
                       Filed Sept. 25, 1925          2 Sheets-Sheet 1
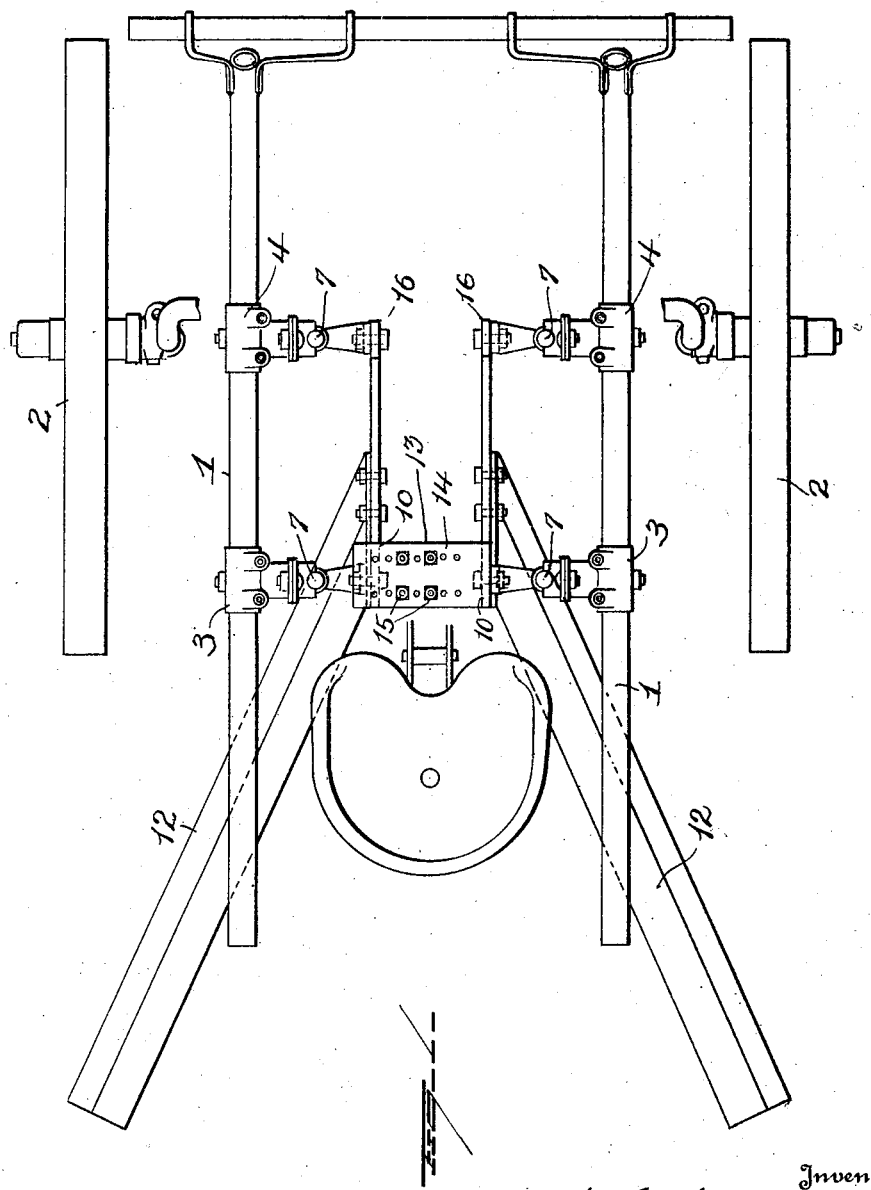

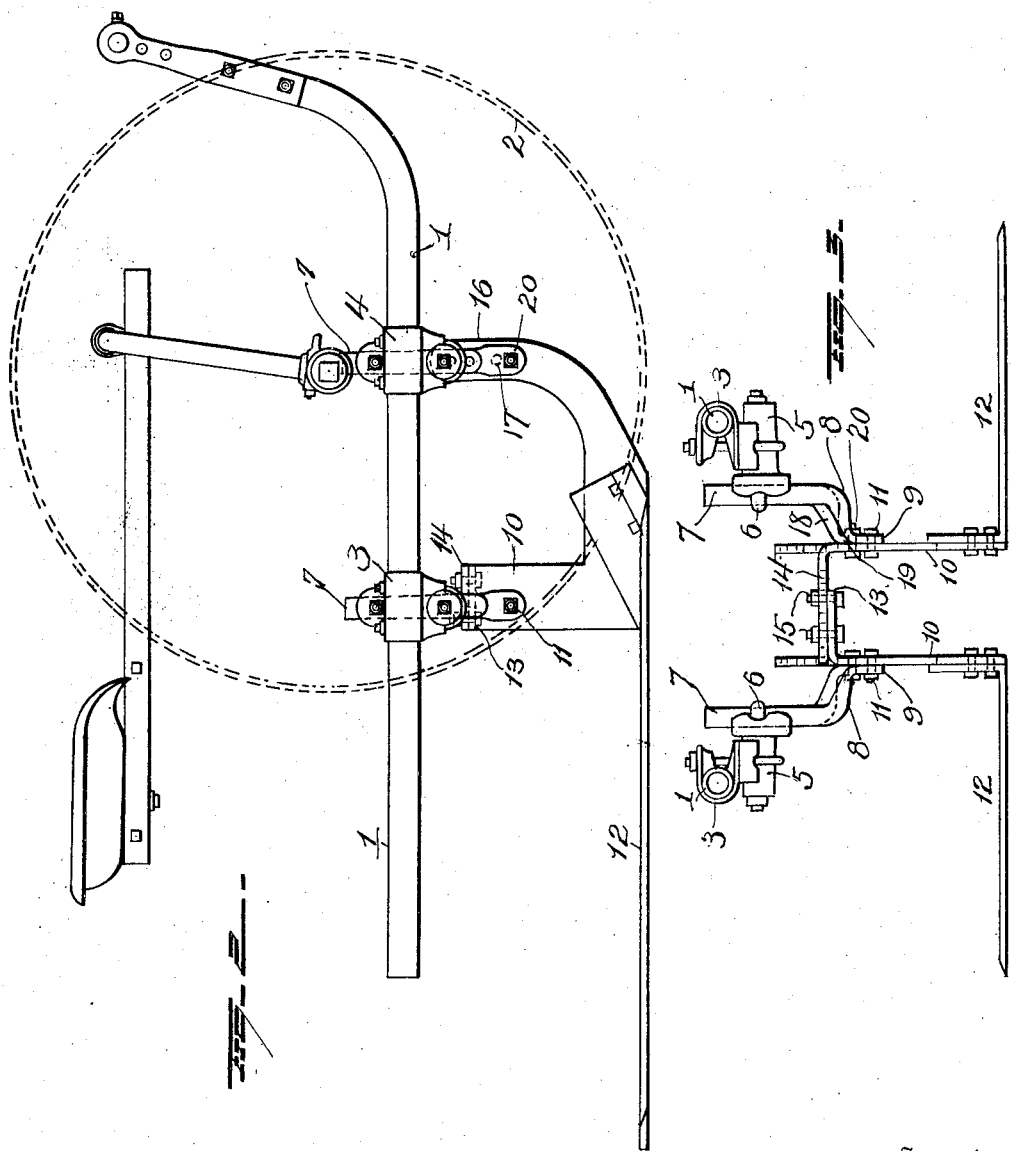

Patented Sept. 20, 1927.

1,642,801

UNITED STATES PATENT OFFICE.

HERMAN E. ALTGELT, OF SOUTH BEND, INDIANA, ASSIGNOR TO OLIVER CHILLED PLOW WORKS, OF SOUTH BEND, INDIANA.

CULTIVATOR.

Application filed September 25, 1925. Serial No. 58,585.

This invention relates to improvements in cultivators and more particularly to an improved knife attachment for cultivators,— one object of the invention being to provide a simple construction in which the knives shall be supported from the beams of the cultivator and be capable of ready adjustment relatively to each other and also be capable of being held in a horizontal position or in a tilted position.

A further object is to so construct and arrange the knife or blade devices that they shall be capable of use in fields that are left level after the completion of planting and also in fields where the crops have been planted in trenches with listers.

A further object is to so construct the mechanism that the front and rear ends of the blades may be drawn through the ground at an even distance from the surface.

With these and other objects in view, the invention consists in certain novel features of construction and combinations of parts as hereinafter set forth and pointed out in the claims.

In the accompanying drawings,—

Figure 1 is a plan view of a portion of a cultivator showing an embodiment of my invention, Figure 2 is a view in side elevation, and Figure 3 is a view in rear elevation.

The beams of the cultivator may be in the form of pipes indicated at 1—1 and these are connected with a suitable frame mounted on wheels 2. To each of the beams 1 two brackets 3 and 4 are clamped or otherwise secured and each bracket includes a tubular member 5 through which a clamping bolt 6 is passed and receives a vertical bar 7 to clamp the same to the bracket. The brackets 3 and 4 are spaced apart on the respective beams 1 and the supporting bars 7 secured to the rear brackets 3 are bent inwardly at their lower ends as at 8 and then downwardly as at 9 so that the depending ends of the respective bars carried by the rear brackets will be parallel with each other and the lower parallel portions 9 are secured to runners 10 by means of bolts 11. To the lower portions of these runners, blades 12 are securely bolted and project rearwardly therefrom in diagonal or divergent directions as clearly indicated in Figure 1. The upper ends of the runners are provided with inwardly projecting arms 13, one overlying the other and one of said arms is provided with a plurality of bolt holes 14 for the passage of bolts 15,—said bolts also passing through suitable holes in the other arm. The runners thus form an arch for the accommodation of the plants and this arch may be adjusted in width by moving the runners laterally with respect to each other and secured in such adjusted position by means of the bolts 15 passing through certain of the holes 14 in one of the arms 13 and also through the holes provided in the other arm for said bolts.

The forward ends of the runners 10 extend upwardly as indicated at 16 and these upwardly extending portions are provided each with a plurality of holes 17. The lower ends of the supporting bars 7 which are secured to the forward bracket 4 are bent inwardly at their lower end portions as at 18 and then downwardly as at 19 to lie parallel with the upwardly projecting forward ends 16 of the runners. The depending portions of the forward supporting bars are provided with holes for the accommodation of bolts 20, which bolts will also be passed through one or another of the holes 17 in the portions 16 of the runners. When the bolts 20 are passed through the lower holes 17, the runners and hence the blades will be disposed in horizontal position as shown in Figure 2, but if the bolts 20 be passed through the upper or an intermediate hole 17 in the runner member 16, the runners and hence the blades will be disposed in tilted positions.

The aim is to draw the front and rear ends of the blades through the ground at an even distance from the surface and the object of the adjustment above described is to be able to set or tilt the blades in such manner that this will be accomplished as nearly as possible in fields that are planted level as well as in fields where trenches are made by the lister. Some adjustments of the position of the blades can also be made by moving the forward or rear or both supporting bars 7 up or down in the brackets 3—4.

Having fully described my invention what I claim as new and desire to secure by Letters Patent. is:

1. The combination with two spaced cultivator beams, and vertical forward and rearward bars supported by each beam, of two runners having vertically adjustable connection respectively with the forward vertical bars, each runner having an upright portion connected with one of the rearward vertical bars, overlapping arms projecting inwardly from the vertical rear portions of the respective runners, means for adjustably connecting said arms, and blades secured to side portions of the respective runners and extending outwardly and rearwardly therefrom.

2. The combination with cultivator beams, of runners, each having an upwardly projecting forward member, forward and rear brackets secured to the beams, supporting bars secured to the rear brackets on the beams and to the rear portions of said runners, supporting members secured to the forward brackets on said beams, and means for effecting adjustable connection between the upwardly extending members of the runners and the forward supporting members.

In testimony whereof, I have signed this specification.

HERMAN E. ALTGELT.